United States Patent [19]

Sakamaki et al.

[11] Patent Number: 4,605,695

[45] Date of Patent: Aug. 12, 1986

[54] HEAT- AND ABRASION-RESISTANT COATING MATERIAL

[75] Inventors: Hiroshi Sakamaki, Utsunomiya; Yukio Horikoshi, Kazo; Kikuji Yanagihashi, Yono, all of Japan

[73] Assignee: Nippon Piston Ring Co., Ltd., Tokyo, Japan

[21] Appl. No.: 666,239

[22] PCT Filed: Feb. 21, 1984

[86] PCT No.: PCT/JP84/00058

§ 371 Date: Oct. 17, 1984

§ 102(e) Date: Oct. 17, 1984

[87] PCT Pub. No.: WO84/03291

PCT Pub. Date: Aug. 30, 1984

[30] Foreign Application Priority Data

Feb. 24, 1983 [JP] Japan .................................. 58-28488

[51] Int. Cl.$^4$ ................... C08K 3/04; C08K 3/14; C08K 3/20; C08L 27/18

[52] U.S. Cl. ................... 524/424; 428/327; 428/458; 428/461; 428/463; 524/428; 524/430; 524/443; 524/493; 524/496; 524/520; 525/199

[58] Field of Search ........... 428/458, 461, 327, 463; 524/520, 424, 428, 430, 443, 493, 496; 525/199

[56] References Cited

U.S. PATENT DOCUMENTS

| | | | |
|---|---|---|---|
| 2,789,960 | 4/1957 | Smith | 524/520 |
| 2,976,257 | 3/1961 | Dawe et al. | 524/520 |
| 3,531,432 | 9/1970 | Graver | 525/199 |
| 3,769,252 | 10/1973 | Fuji et al. | 524/520 |
| 3,904,575 | 9/1975 | Satokawa et al. | 524/520 |

FOREIGN PATENT DOCUMENTS

| | | |
|---|---|---|
| 55-127462 | 10/1980 | Japan . |
| 56-2338 | 1/1981 | Japan . |
| 56-18624 | 2/1981 | Japan . |
| 57-195149 | 11/1982 | Japan . |
| 860299 | 2/1961 | United Kingdom ........... 524/520 |

*Primary Examiner*—Allan M. Lieberman
*Attorney, Agent, or Firm*—Birch, Stewart, Kolasch & Birch

[57] ABSTRACT

A coating material for use in oil-free type sliding members comprising a powder mixture prepared by mixing a finely powdered resin mixture composed of 70 to 90 weight % of finely powdered tetrafluoroethylenehexafluoropropylene copolymer resin and 10 to 30 weight % of finely powdered polyimide resin with 5 to 15 weight %, based on the total weight, of one or more of $ZrO_2$, SiC, $Si_3N_4$, $Al_2O_3$, carbon C and tetrafluoroethylene resin of 0.2 to 1.0 micron meter in particle size is applied, as a suspension, onto sliding members, and baked to form a coating thereon.

1 Claim, 2 Drawing Figures

HEAT- AND ABRASION-RESISTANT COATING MATERIAL

TECHNICAL FIELD

The present invention relates to a heat- and abrasion-resistant coating material used for protecting a sliding member without lubrication oil.

BACKGROUND ART

Oil free type vane pumps are used as a supercharger for an automobile engine and as a refrigerating compressor for a vehicle and provided with sliding members made of self-lubricating materials or covered by a self-lubricating resin. However, the known self-lubricating resins are unsatisfactory in durability under severe operating conditions. There is a strong demand for an improved resin coating material.

To meet the demand as described above, it is an object of the present invention to provide a resin material that is superior in heat- and abrasion-resistant properties under severe operating conditions.

DISCLOSURE OF THE INVENTION

The material according to the present invention is characterised in that a powder mixture prepared by mixing a finely powdered resin mixture composed of 70 to 90 weight % of finely powdered tetrafluoroethylenehexafluoropropylene copolymer resin and 10 to 30 weight % of finely powdered polyimide resin with 5 to 15 weight %, based on the total weight, of one or more of zirconia ($ZrO_2$), silicon carbide (SiC), silicon nitride ($Si_3N_4$), alumina ($Al_2O_3$), carbon (C) and tetrafluoroethylene resin of 0.2 to 1.0 micron meter in particle size is applied, as a suspension, onto a sliding member, and baked to form a coating thereon. Usual aqueous and organic solvents, such as toluene and methanol, are available in making the suspension, which is coated on the surface of the sliding member by means of coating, such as spraying and the like, and then baked to a film at a range of 300° to 390° C. for about 15 minutes.

The activity of the individual components and the reason for limiting their amounts are explained below.

The finely powdered tetrafluoroethylenehexafluoropropylene copolymer resin is the base of the inventive material and necessary for improvements in both heat and abrasion resistance and in adhesion. The amount of the copolymer resin is closely related to that of the polyimide resin. If it is less than 70 weight %, the coated material is unsatisfactory in adhesion and abrasion resistance, thereby having the possibility of peeling. On the other hand, if it is more than 90 weight %, the copolymer resin makes a poor combination with other components. Therefore, the amount is restricted to a range of 70 to 90 weight %.

The finely powdered polyimide resin is added as a binder. If it has an amount less than 10 weight %, it is insufficient to bind the mixture and keep the same adhesive. On the other hand, if it is more than 30 weight %, the baked material has an abrasion resistant lowered due to lack of the tetrafluoroethylenhexafluoropropylene copolymer resin. Therefore, it is limited to a range of 10 to 30 weight %.

One or more of powdered $ZrO_2$, SiC, $Si_3N_4$, $Al_2O_3$, C, and tetrafluoroethylene resin are mixed in a rate of 5 to 15 weight % based on the mixture of the tetrafluorohexafluoropropylene resin and polyimide resin. If the amount is less than 5 weight %, the abrasion resistance is unsatisfactory. On the other hand, the amount is more than 15 weight %, the powders are unevenly distributed and easy to drop out of the mixture and give damage to the opposite sliding member. Therefore, the ratio is limited to a range of 5 to 15 weight %. Their particle size is restricted within a range of 0.2 to 1.0 micron meter. The reason for this is that it is inferior in abrasion resistance if smaller than 0.2 micron meter and likely to cause abnormal wear on the opposite sliding member if larger than 1.0 micron meter.

The material has a composition of the base of tetrafluorohexafluoropropylene copolymer resin and additives of polyimide resin and one or more of $ZrO_2$, SiC, $Si_3N_4$, $Al_2O_3$, C, and tetrafluoroethylen resin. The base is superior in heat and abrasion resistance. The polyimide resin gives the material a good adhesive property. Besides, antiwear powders, such as $ZrO_2$ and the like are distributed in the material at an appropriate ratio to improve in abrasion resistance.

The advantage offered by the invention is that a vane compressor with sliding members coated by the above mentioned material has a good performance while it is used as a supercharger for an internal combustion engine under very severe conditions. The inventive coating material is not limited to a vane compressor but applied to any apparatus which is required to have heat- and abrasion resistant coating material.

BEST MODE OF CARRYING OUT THE INVENTION

The invention is described in detail below with reference to drawings which illustrate only one embodiment applied to a vane compressor used as a supercharger for an internal combustion engine.

Figure 1:
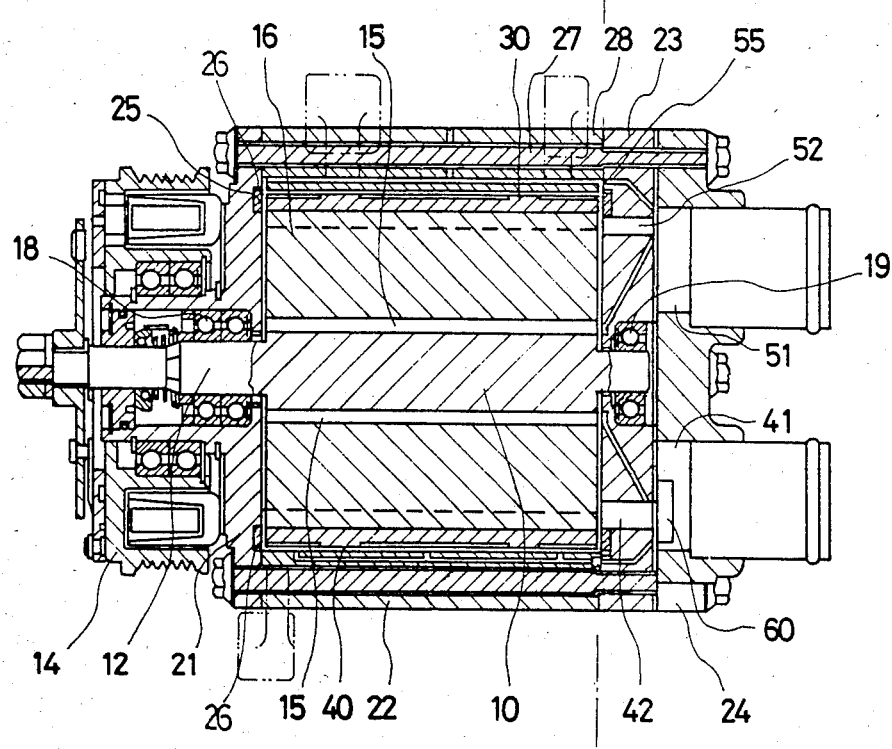
FIG. 1 is a longitudinal section of the vane compressor with the sliding members coated by the material of the invention.

Referring initially to FIG. 1, the compressor has a rotor 10 integrally shaped with a shaft 12 rotatably supported by bearings 18, 19 in the respective front and rear housings 21, 23 and fixed at the front end thereof to a pulley 14 which is a non-illustrated engine. A gasket is interposed between the rear housing 23 and the rear cover 24 in which the discharge chamber 41 and the suction chamber 51 are provided. The discharge chamber 41 is internally connected to a discharge port 42 through a discharge valve 60 to a discharge port 42, which is vent to a compression working space 43 of FIG. 2. The suction chamber 51 is internally connected to a suction port 52, which is vent to a suction working space 53 of FIG. 2. The front and rear housings 21, 23 have their inner surfaces formed with annular grooves 26 in which self-lubrication bearing members 25 are embedded for smooth contact with the end surfaces of the rotary sleeve 30.

Figure 2:
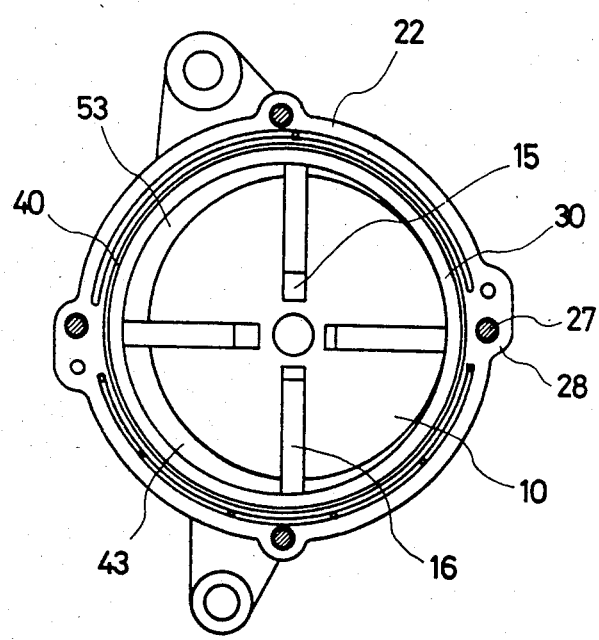
FIG. 2 is a section taken along the line II—II of FIG. 1.

As seen in FIGS. 1 and 2, a plurality of vanes 16 are slidably fitted in the vane grooves 15 in the rotor 10 and have the apexes in contact with the rotary sleeve 30, which is mounted within the center housing 22 to define a filmy air-bearing room 40 of 0.02 mm to 0.15 mm radial depth therebetween. As seen in FIG. 1, bolts 27 pass through the thick wall portions 28 of the center housing 22 to axially fasten the front and rear housings 21, 23, the center housing 22 and the rear cover 24.

In the aforementioned vane compressor, the outer periphery of the rotary sleeve 30 and the inner periphery of the center housing 22 slide on each other under very severe conditions without lubricating oil. Accordingly, it is necessary for the outer periphery of the rotary sleeve and/or the inner periphery of the center housing to be protected by the following heat- and abrasion-resistant coating material of the invention:

A powder mixture prepared by mixing a finely powdered resin mixture composed of 70 to 90 weight % of finely powdered tetrafluoroethylenehexafluoropropylene copylmer resin and 10 to 30 weight % of finely powdered polyimide resin with 5 to 15 weight %, based on the total weight, of one or more of zirconia ($ZrO_2$), silicon carbide (SiC), silicon nitride ($Si_3N_4$), alumina ($Al_2O_3$), carbon (C) and tetrafluoroethylene resin of 0.2 to 1.0 micron meter in particle size is applied, as a supsension, onto sliding members, and baked to form a coating thereon. Usual aqueous and organic solvents, such as toluen and methanol, are available in making the suspension, which is coated on the surface of the sliding member by means of coating, such as sraying and the like, and then baked to a film at a range of 300° to 390° C. for about 15 minutes.

INDUSTRIAL APPLICABILITY

The coating material of the invention is applied to the inner periphery of the center housing and/or the outer periphery of the rotary sleeve for oil-free type vane compressors, pumps and motors.

We claim:

1. A heat- and abrasion-resistant coating material comprising a finely powdered resin mixture of 70 to 90 weight % of finely powdered tetrafluoroethylenehexafluoropropylene copolymer resin and 10 to 30 weight % of finely powdered polyimide resin containing 5 to 15 weight %, based on the total weight, of at least one inorganic member selected from the group consisting of $ZrO_2$, SiC, $Si_3N_4$, $Al_2O_3$, and C having a particle size of 0.2 to 1.0 micron meter, said material being adapted to be applied, as a supension, onto sliding members, and baked to form a coating thereon.

* * * * *